United States Patent
Pieuchard et al.

3,721,487
March 20, 1973

[54] OPTICAL DIFFRACTION GRATING SCANNING DEVICE

[75] Inventors: Guy Pieuchard, Fontenay Le Fleury; Jean Flamand, Chatenay Malabry; Antoine Labeyrie, Gif Sur Yvette, all of France

[73] Assignee: JOBIN-YVON, ARCUEIL, Arcueil, France

[22] Filed: July 9, 1971

[21] Appl. No.: 161,038

[30] Foreign Application Priority Data

July 23, 1970 France.................................7027185

[52] U.S. Cl..................350/7, 350/3.5, 350/162 R
[51] Int. Cl................................................G02b 5/18
[58] Field of Search ................350/162 R, 162 ZP, 7

[56] References Cited

UNITED STATES PATENTS

| | | | |
|---|---|---|---|
| 3,619,033 | 11/1971 | McMahon | 350/162 ZP |
| 3,614,193 | 10/1971 | Beiser | 350/162 ZP X |
| 3,578,845 | 5/1971 | Brooks et al. | 350/162 R |

*Primary Examiner*—John K. Corbin
*Attorney*—Alan H. Levine et al.

[57] ABSTRACT

An optical scanning device comprises a source of monochromatic light and diffraction gratings on a spherical concave surface for producing a number of light-spots having a diameter of between 0.1 and 100 microns. The concave surface is rotated so that the light-spots describe a single circle intersecting, along the scanning line, a surface to be explored.

4 Claims, 5 Drawing Figures

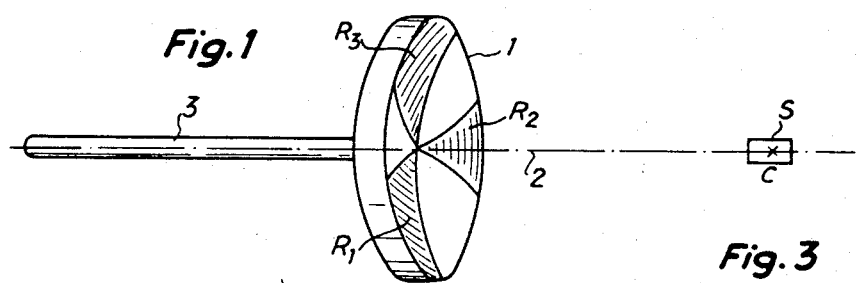
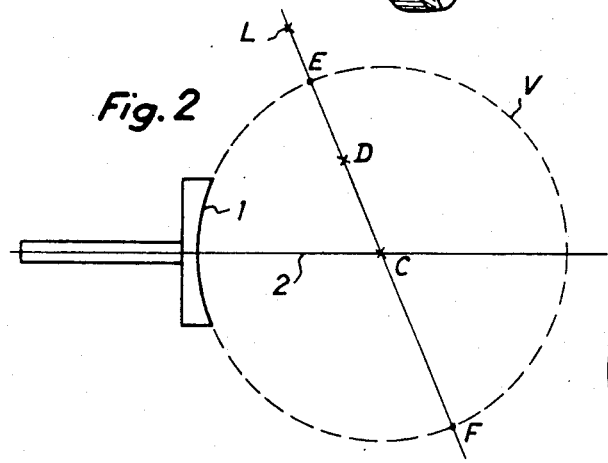
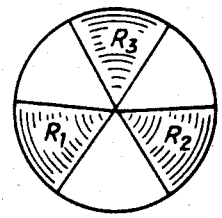
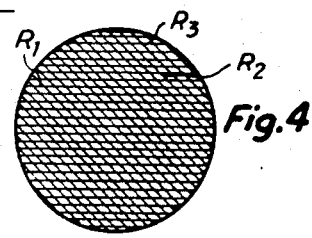
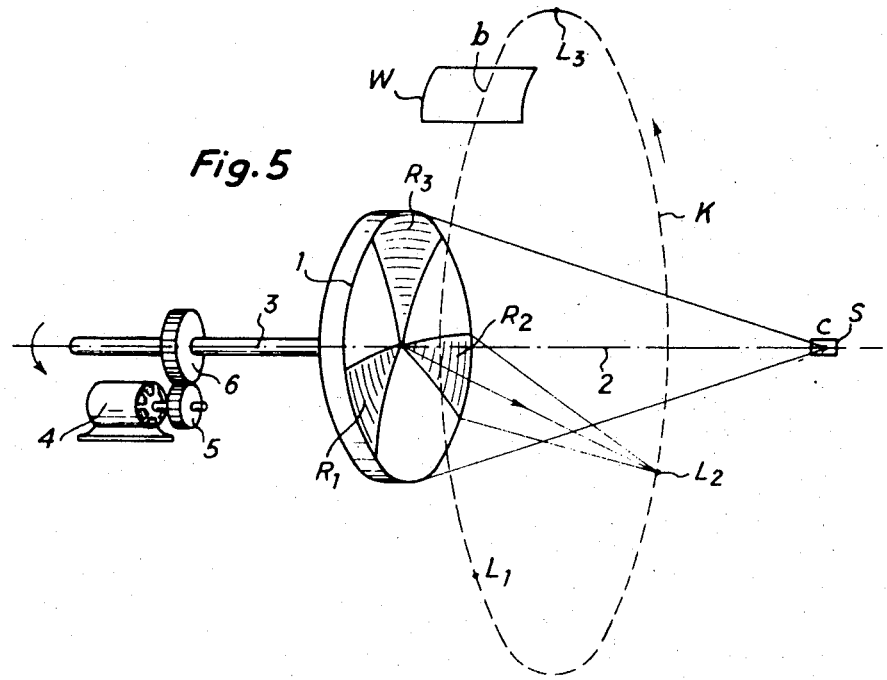

3,721,487

OPTICAL DIFFRACTION GRATING SCANNING DEVICE

FIELD OF THE INVENTION

The present invention relates to an optical scanning device, and more particularly to an optical scanning device for scanning a line on a surface either for analysis of the surface content along that line or to enable the content of the corresponding line to be recreated form an analysis already made.

SUMMARY OF THE INVENTION

According to the invention, there is provided in an optical scanning device for exploring a line on a surface by means of a light-spot, means producing a number of monochromatic light-spots, each having the same wave-length ($\lambda$) and being between 0.1 and 100 microns in diameter, and means rotating the spots simultaneously about a common axis so as to describe a single circle intersecting the surface along the said line.

Preferably the diameter of the light-spots lies between 1.0 and 10 microns. The dimensions of the light-spots are such that all the information contained in the surface it is proposed to analyze is in fact analyzed.

BRIEF DESCRIPTION OF THE DRAWINGS

An embodiment of the invention will now be described, by way of example only, with reference to the accompanying drawings, in which:

FIG. 1 is a perspective view of an optical scanning device in accordance with the invention;

FIG. 2 illustrates a method of manufacturing diffraction gratings used in the device shown in FIG. 1;

FIGS. 3 and 4 are simplified front elevations of two different forms of gratings; and FIG. 5 is a perspective view of the device in greater detail and showing the manner in which the device functions.

DESCRIPTION OF THE PREFERRED EMBODIMENT

As shown in FIG. 1 a scanning device comprises a member 1 having a concave surface which lies on a portion of the surface of an imaginary sphere, which is centered on an axis 2. Diffraction gratings are formed on the surface of the member 1, the number of gratings being equal to the number of monochromatic light-spots to be produced. As shown, there are three gratings $R_1$, $R_2$ and $R_3$.

A monochromatic light source S is placed at the center C of the imaginary sphere so that each grating receiving light from the sources diffracts in space a spot situated on a circle common to all the spots. This circle K, is not shown in FIG. 1, but it can be seen in FIG. 5, which also shows the three spots $L_1$, $L_2$, and $L_3$ diffracted by the gratings $R_1$, $R_2$ and $R_3$ respectively.

The wavelength of the spots is, of course, identical to that of the source.

The member 1 is mounted on a spindle 3 (FIG. 5), the spindle 3 being rotated by drive means about its longitudinal axis, which is aligned with the axis 2. As shown, the drive means comprises a motor 4, which drives the spindle 3 through gear wheels 5 and 6. Other means can naturally be used for rotating the member 1 about the axis 2.

The gratings carried by the member 1 can be readily obtained as "holographic diffraction gratings", that is to say by recording a system of interference fringes, obtained on the member 1 from two sources of coherent light. Such gratings are described, for example, in the following articles:

"Les Reseaux Holographiques", by Jean Cordelle, which appeared in the journal "Atomes/Instruments de Mesure", vol. 24, pp. 763 to 765;

"Spectrographic performance of holographically made diffraction gratings", by Antoine Labeyrie and Jean Flamand, which appeared in the journal "Optics Communications", vol. 1, April, 1969, pp. 5 and 8; and "Aberration-Corrected Concave Gratings made Holographically", by Jean Cordelle, Jean Flamand and Guy Pieuchard, which appeared in the book "Optical Instruments and Techniques, 1969" (Oriel Press, London).

In the present case to produce the gratings, if $\lambda$ is the wavelength of the source S to be used in operation of the device, and $\lambda_o$ is the wavelength of each of two sources used for making the diffraction gratings, with the ratio $\lambda/\lambda_o = m$, preferably one of the two sources is placed at the center C of the imaginary sphere and the other is placed at a point D such that, if L is the spot to be obtained, the points D and L divide harmonically, in the ratio $m$, the diameter EF of the imaginary sphere, which diameter passes through the points D and L. In other words the relationship $$EL/ED = FL/FD = m$$

must hold good, the position of the spot L being defined a priori in relation to the apex of the member 1, this relationship determining both the radius of curvature of the imaginary sphere (point C) and the point D.

For making the different gratings, the two sources are kept in the positions C and D and the member 1 is rotated about the axis 2 each time through the angle to be subtended between two consecutive spots, or alternatively the member 1 is held stationary and the light sources are rotated about the axis 2.

The gratings are obtained in the form of sectors such as shown in FIG. 3 or in criss-cross form, as shown in FIG. 4.

The gratings can be concave or convex.

To increase the light efficiency of the gratings carried by the member 1, there is advantage in metallizing the member 1 in vacuo once the gratings have been prepared.

To scan a line $b$ in a surface W (FIG. 5), the member 1 is rotated about the axis 2, so that the light-spots will describe one and the same circle K, the surface W being so arranged that the circle K intersects the surface W along the line $b$.

To scan the whole area of the surface W the surface is moved between every two consecutive sweeps, so as to vary the position of the line at which the surface is intersected by the circle K.

The device can be used for analyzing an image carried by a surface and for re-creating that image. For example, the surface to be analyzed can be a photographic film behind which a photo-multiplier is placed; in this case, analysis of the surface by the device based on the invention results in modulation of the light intensity received by the photo-multiplier. To re-create the image, an identical device is used, but with the light source S modulated to conform to the modulation of the light previously received by the photo-multiplier; the image is thus recreated on a reproduction surface arranged in a position corresponding to the surface analyzed.

The resolution of the device particularly described is distinctly better than the line resolution of an electronic scanning device, which is of the order of 1,300 microns.

What is claimed is:

1. An optical scanning device for exploring a line on a surface by means of a light-spot, comprising:

means producing a number of monochromatic light-spots, each having the same wave-length ($\lambda$) and being between 0.1 and 100 microns in diameter; and means rotating the spots simultaneously about a common axis so as to describe a single circle intersecting the surface along the line;

said light-spot producing means comprising a member having a concave surface, said surface lying on a portion of the surface of an imaginary sphere centered on said axis; diffraction grating means formed on said concave surface, the number of said diffraction grating means being equal to the number of light-spots produced; and a source of nonochromatic light of the said wavelength ($\lambda$) located at the center of said imaginary sphere, whereby each diffraction grating means receiving light from said source diffracts a light-spot lying in a common imaginary circle; and wherein said diffraction grating means is a holographic grating produced by recording a system of interference fringes, obtained on said member from two sources of coherent light of wave length $\lambda_o$ positioned respectively at the center of said imaginary sphere and at a point such that said point and the spot it is desired to obtain divide harmonically, in the ratio $\lambda/\lambda_o$, a diameter of the said imaginary sphere, which diameter passes through said point and the spot.

2. A device as claimed in claim 1, in which the diameter of the spots is between 1.0 and 10 microns.

3. An optical scanning device as claimed in claim 1 in which said diffraction grating means are in the form of sectors.

4. A device as claimed in claim 1 further comprising spindle means mounting said member, the longitudinal axis of said spindle means being aligned with said axis, and means rotating said spindle means about its longitudinal axis.

* * * * *